United States Patent
Lindsey et al.

(10) Patent No.: US 7,303,085 B2
(45) Date of Patent: Dec. 4, 2007

(54) METHOD AND APPARATUS FOR PURIFYING MIXTURES OF OIL AND WATER

(75) Inventors: Timothy C. Lindsey, Mahomet, IL (US); Joseph Pickowitz, Pesotum, IL (US); Stephen Rundell, Riverwoods, IL (US)

(73) Assignee: Chemical Management Systems, LLC, Elk Grove Village, IL (US)

( * ) Notice: Subject to any disclaimer, the term of this patent is extended or adjusted under 35 U.S.C. 154(b) by 537 days.

(21) Appl. No.: 10/909,152

(22) Filed: Jul. 30, 2004

(65) Prior Publication Data
US 2005/0035037 A1    Feb. 17, 2005

Related U.S. Application Data

(60) Provisional application No. 60/494,217, filed on Aug. 12, 2003.

(51) Int. Cl.
*B01D 17/025* (2006.01)
(52) U.S. Cl. .................. 210/521; 210/532.1; 210/534; 210/538; 210/540; 210/115; 210/DIG. 5
(58) Field of Classification Search ................ 210/112, 210/115, 257.1, 521, 538, 540, 799, 800, 210/801, 803, 532.1, 534, DIG. 5
See application file for complete search history.

(56) References Cited

U.S. PATENT DOCUMENTS

| | | | |
|---|---|---|---|
| 4,123,365 A | 10/1978 | Middelbeek | |
| 4,333,835 A * | 6/1982 | Lynch | .......... 210/305 |
| 4,361,488 A | 11/1982 | White et al. | |
| 4,802,978 A * | 2/1989 | Schmit et al. | .............. 210/104 |
| 4,980,070 A | 12/1990 | Lieberman | |
| 5,229,015 A * | 7/1993 | Keep et al. | .................. 210/799 |
| 5,324,425 A | 6/1994 | Ellison | |
| 5,395,537 A | 3/1995 | Ellison | |
| 5,398,708 A | 3/1995 | Sheldon | |
| 5,500,132 A | 3/1996 | Elmi | |
| 5,558,745 A | 9/1996 | Conway et al. | |
| 5,679,258 A | 10/1997 | Petersen | |
| 5,720,308 A | 2/1998 | Danowski et al. | |
| 5,730,872 A | 3/1998 | Rhodes | |

(Continued)

FOREIGN PATENT DOCUMENTS

GB     2104791 A     3/1983

*Primary Examiner*—Joseph Drodge
(74) *Attorney, Agent, or Firm*—Drinker Biddle & Reath LLP

(57) ABSTRACT

An apparatus and method for separating oil and particulate contaminants from pump-driven aqueous fluid contaminated with emulsified oils, free oils, particulate matter, suspended solids, and other contaminants in which the contaminated fluids are introduced into a container having a horizontal bottom portion and a weir plate dividing the container into an upper clean fluid compartment and a lower separation compartment, an aperture for the outflow of clean fluid from the upper clean fluid compartment sized relative to the pumping rate of the pump driving the aqueous fluid to ensure a residence time of the contaminated fluid in the lower separation compartment of at least about 0.4 minutes, coalescing media comprising a plurality of abutting polypropylene spheres located in the lower separation compartment, and a drain receptacle for collecting the contaminated fluid and delivering the contaminated fluid across the weir plate to the lower separation compartment.

31 Claims, 5 Drawing Sheets

U.S. PATENT DOCUMENTS 5,897,773 A    4/1999   Rhodes
6,315,131 B1   11/2001  Terrien et al.
6,322,694 B1   11/2001  Iliadis et al.
6,391,198 B1   5/2002   Porter et al.

* cited by examiner

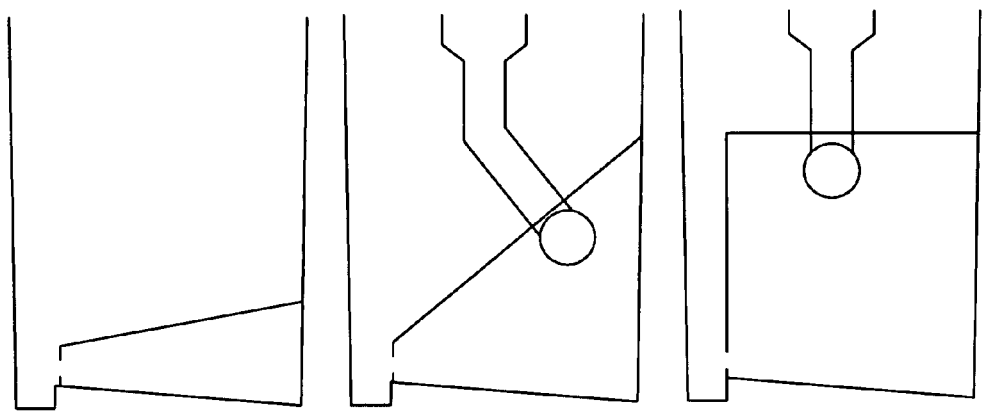
FIG. 1A
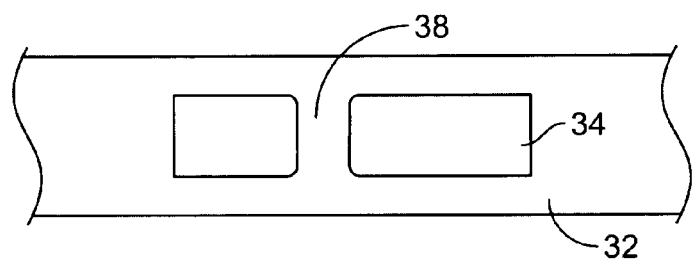
FIG. 1B
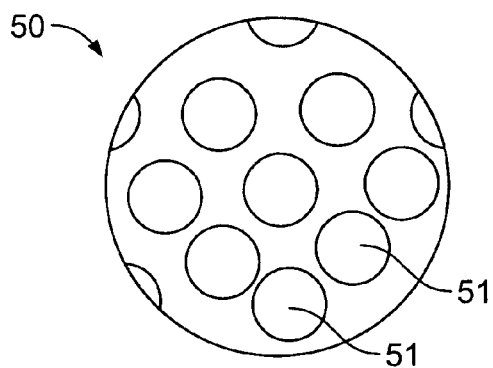 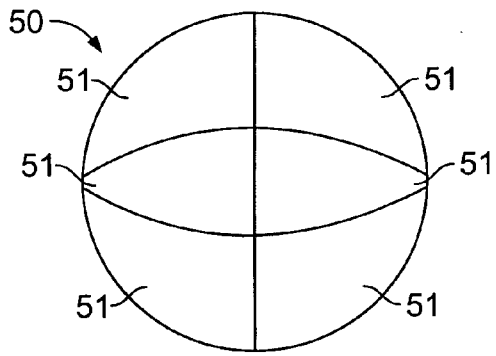
FIG. 1C        FIG. 1D

METHOD AND APPARATUS FOR PURIFYING MIXTURES OF OIL AND WATER

CROSS-REFERENCE TO RELATED APPLICATIONS

This application claims the benefit of U.S. Provisional Application Ser. No. 60/494,217, filed Aug. 12, 2003.

BACKGROUND OF THE INVENTION

This invention relates generally to methods and apparatus for recycling contaminated fluids, and, more particularly, to an improved method and apparatus for separating oil and particulate contaminates from pump-driven aqueous fluid contaminated with emulsified oils, free oils, particulate matter, suspended solids, and other contaminants.

Aqueous-based industrial process fluids such as degreasing/washing chemicals or metalworking fluids are frequently applied by pumping the fluids through a process pump to transport it through plumbing and nozzles to a workstation where the intended degreasing/washing or metalworking lubrication and cooling are performed before the fluid is collected and sent back through the system again. Such fluids are quickly contaminated with increasing amounts of emulsified oils, free oils, particulate matter, suspended solids, and other contaminants that degrade their effectiveness and can impede the pumping process.

The present invention makes possible the separation of emulsified oils, free oils, particulate matter, suspended solids, and other contaminants from aqueous industrial process fluids as the fluid is being pumped from the storage reservoir to the application nozzles. The separation process may be accomplished within the confines of an already existing parts washer, coolant sump, or other process equipment so that no additional tanks or pumps are required. An optional reservoir collects oil separated by the process. The invention thus can be used to purify aqueous process fluids as a stand-alone system or as a treatment unit integrated into an already existing degreasing, washing or metalworking pretreatment cooling system. The system and apparatus of the invention can also be used in pretreating contaminated aqueous fluids in other purification systems such as systems using coarse filters and membranes.

Coalescing technology is available to purify many different fluids. For example, such technology is available to prepare a waste stream for sewer discharge or to recycle process fluids. Prior approaches have typically been stand-alone systems for processing fluids offline. These approaches often result in unnecessary expense since they require additional pumping devices, tanks, filters, etc. The present invention may be implemented without additional pumping devices, tanks or filters.

The present invention comprises an improved process and apparatus that provides a more efficient and economic means for continuously purifying aqueous industrial process fluids as they are being used than has heretofore been available. This is accomplished in a separator unit of the invention by physically integrating coalescing media and gravity separation into the device using a weir plate, appropriate plumbing and valves, and optionally an oil collection reservoir.

Accordingly, it is an object of the present invention to provide new methods and apparatus for separating oil and particulate contaminates from pump-driven aqueous fluids contaminated with emulsified oils, free oils, particulate matter, suspended solids, and other contaminants.

A further object of the present invention is to provide a particularly convenient and efficient method and apparatus for separating emulsified oils, free oils, particulate matter, suspended solids, and other contaminants from aqueous industrial process fluids while the fluid is being pumped from a storage reservoir to application nozzles to thereby act on the oils before they are strongly emulsified.

Still another object of the present invention is to provide such a system that can be located within the confines of an already existing parts washer, coolant sump, or other process equipment so that no additional tanks or pumps are required.

The above and other objects, features and advantages of the present invention will become apparent upon consideration of the following detailed description of specific embodiments thereof, taken in conjunction with the accompanying drawings.

SUMMARY OF THE INVENTION

The present invention will separate oil and particulate contaminants from pump-driven aqueous fluids whose quality of performance may have degraded due to the accumulation of contaminants like emulsified oils, free oils, particulate matter, suspended solids and other insoluble contaminants. The invention may be implemented without additional pumping or filtering devices.

In the present process, purification of contaminated aqueous industrial process fluids may be accomplished by passing the fluids through coalescing media positioned in a process tank during normal recirculation of the fluid as it leaves the workstation after performing its intended degreasing/washing or metalworking lubrication/cooling functions and passes into a collection reservoir. The aqueous fluid used in the process flows through a drain to an area where it enters into a coalescing media and passes generally downward along a weir plate on its way to returning to the already present process pump. The weir plate establishes a demarcation separating the clean side (top) of the tank from the dirty side (bottom). As the aqueous fluid is drawn to the pump due to the pressure differential created by the pump's suction, it is drawn through the coalescing media. Viscosity differences between the oil-based contaminants and the aqueous phase cause the oil and aqueous phases to separate and the oil (and any other lighter-than-water components) to rise. The rising oil is intercepted by the weir plate and diverted to a reservoir where it can be collected and readily disposed of or recycled.

BRIEF DESCRIPTION OF THE DRAWINGS

The features of this invention which are believed to be novel are set forth with particularity in the appended claims. The invention, together with its objects and advantages, may be best understood by reference to the following description, taken in conjunction with the following drawings, in which like reference numbers identify like elements in the several figures and in which:

FIG. 1A includes diagrammatic representations of different weir plate configurations in the separator unit of FIG. 1;

FIG. 1B is a partial view of a flow aperture at the lower edge of the weir plate in the separator unit of FIG. 1;

FIG. 1C is a representation of a coalescing sphere that can be used in separator units of the present invention;

FIG. 1D is a representation of a different coalescing sphere that can be used in separator units of the present invention;

DESCRIPTION OF PREFERRED EMBODIMENTS

Figure 1:
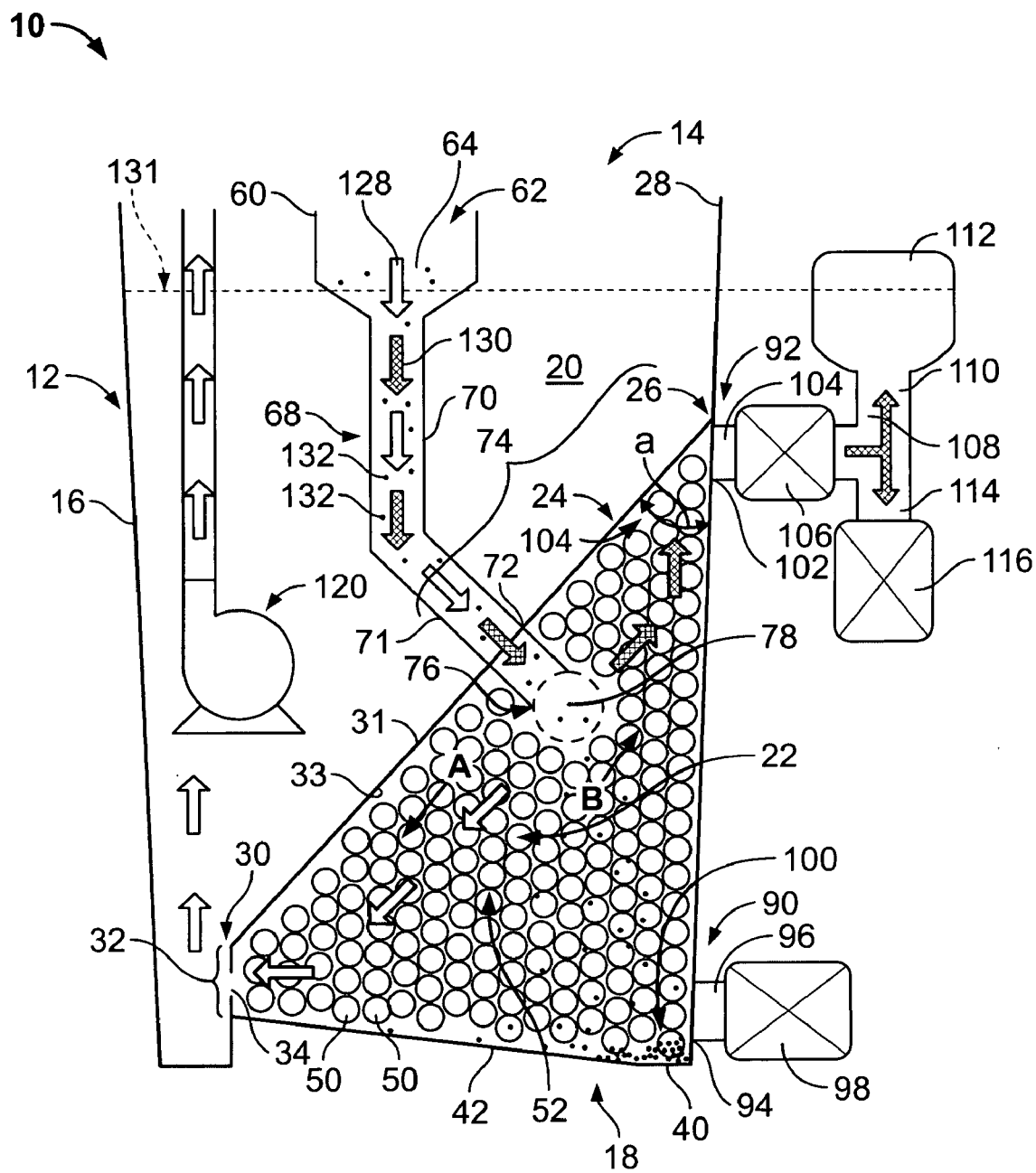
FIG. 1 is a diagrammatic representation of separator unit in accordance with the present invention.

FIG. 1 is a diagrammatic representation of one separator unit 10 in accordance with the present invention and its method of operation. Separator unit 10 comprises a tank or container 12 having a generally open top 14, a side 16 encircling the generally cylindrical unit and a closed bottom 18. The tank may be made in any appropriate shape or of any appropriate material such as an appropriate plastic resin, stainless steel, etc.

Tank 12 has a weir plate 24 that may be viewed as dividing tank 12 into an upper clean fluid compartment 20 and a lower separation compartment 22. Weir plate 24 is dimensioned so that it generally abuts the inner surface 28 of the tank along the top edge or upper periphery 26 of the plate. Weir plate 24 can be fixed in position by welding, molding-in-place, adhesives or other appropriate means. The lower edge 30 of the weir plate is spaced from inner surface 28 of the tank and is provided with a downwardly directed lip 32.

While weir plate 24 is shown as being flat in this configuration, it may be configured in any desirable combinations of vertical, horizontal and angled sections or at a variety of different angles such as those illustrated in FIG. 1A. Also, top and bottom surfaces 31 and 33 of the weir plate preferably may be smooth to facilitate fluid flow in the clean fluid and separation compartments as shown or may have "V"-shaped wings or other obstructions to create a more tortuous path for fluid passing along the plate.

The weir plate extends at an angle "a" towards bottom 18 of the tank. Although angle "a" in the illustrated embodiment is approximately 45°, this angle may be from about 20 to about 90°. Preferably angle "a" will be from about 30 to about 60° and most preferably it will be about 45°. Additionally it is noted that as the angle "a" of the weir plate grows larger than 45 degrees, the efficiency of the use of the coalescing media (described below in connection with coalescing spheres 50) of the separator unit decreases.

A fluid flow aperture 34 is provided in lip 32 of weir plate 24. Aperture 34 should have a cross-sectional area great enough to accommodate the outflow of clean fluid from separation compartment 22 to clean fluid compartment 20. Preferably, aperture 34 will be sized relative to the pump rate to ensure a separation compartment residence time (period of exposure of the contaminated fluid to coalescing spheres 50 discussed below) of at least about 0.4 minutes and preferably at least one minute. The preferred residence times may vary depending on the chemistry used, the degree of contamination, etc. The height of this aperture 34 should be less than the diameter of the coalescing spheres to prevent the escape of the spheres from separation compartment 22. Also, if necessary to maintain the rigidity of lip 32 and to better support lower edge 30 of the weir plate, a series of joints 38 may be placed at intervals along the aperture as illustrated in FIG. 1B.

Bottom 18 of the tank includes first and second ramp portions 40 and 42, where first ramp portion 40, which is generally perpendicular to side 16, flows into second ramp portion 42, which is angled upwardly. In the illustrated embodiment, the second ramp portion is angled upwardly about 10° with respect to the first ramp portion, although this angle may be as great as about 30° or as little as about 0°.

Separation compartment 22 preferably is packed with coalescing media in the form of a plurality of abutting polypropylene coalescing spheres 50 that together comprise a coalescing field 52. Preferably, spheres 50 are hollow and have openings 51 distributed about the surface of the spheres to produce a "wiffle ball"-like structure (FIG. 1C). The diameter of the spheres should be in the range of about 0.5 to about 2.0 inches. Spheres having a diameter of about 1.25 inches and 12 generally equilateral triangular openings 51 about 14.00 mm long to about 8.6 mm wide across are presently preferred (FIG. 1D). Suitable polypropylene spheres may be obtained from Jaeger Products, Inc. of Houston, Tex. as a product identified as "Jaeger Tri-Packs®". Other media shapes could be used such as geodesic domes or stacked ring structures. Also, different media surfaces may be used such as surfaces containing myriad open pores rather than large apertures.

The separation unit may be used, for example, to separate oil and particulate contaminates from pump-driven aqueous fluids contaminated with emulsified oils, free oils, particulate matter, suspended solids, and other contaminants in a degreasing station application as described below. (The same unit may readily be adapted for use in other applications such as in treating contaminated aqueous metalworking/cooling fluids.)

In such a degreasing station application, a drain receptacle 60 is provided to collect the contaminated aqueous degreasing fluid from the sink or other receptacle at the degreasing station. Drain receptacle 60 is located at the top 14 of tank 12 and includes an opening 62 to receive contaminated aqueous fluid 64. While tank 12 is shown to be open at its top in FIG. 1, the top of the tank may be closed so long as receptacle 60 or its equivalent is accessible from outside of the tank to receive fluid 64. In the illustrated embodiment, a feed tube 68 is provided including a vertical member 70 and an angled member 71 that is oriented generally perpendicularly to weir plate 24. Angled member 71 passes through an opening 72 in the weir plate that is preferably located in the upper half 74 of the plate and generally centered with respect to inner surface 28 of tank 12.

Figure 1E:
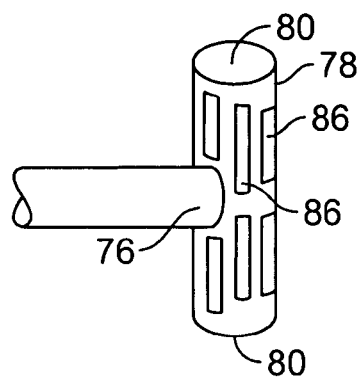
FIG. 1E is a partial view of a fluid distributor used in the separator unit of FIG. 1.

Distal end 76 of tube member 72 is attached to a distributor member 78 that helps direct the contaminated aqueous fluid across the coalescing field. This may be facilitated, as shown in FIG. 1E, by optionally attaching a length of rigid tubing or distributor 78 generally perpendicularly to end 76 of tube member 72 in a "T" configuration. Perpendicular tubing 78 is open at the point of attachment to tube member 72 and closed at its ends 80. Longitudinal slots or holes 86 are provided along tube 78 to slow and distribute the contaminated aqueous fluid as it flows from the tubing into separation compartment 22. Distributors may not be required for certain separation compartment configurations or high flow rates.

In the illustrated embodiment, a particulate removal outlet 90 is provided just above ramp portion 40 and an oil removal outlet 92 is provided just below top edge 26 of weir plate 24. These outlets are intended to be used as needed or desired respectively to remove from the separation compartment collected particulate material that falls to the bottom of the compartment and collected oil-based fluid (and solids and other contaminants suspended or dissolved in the oil) that floats to the top of the separation compartment.

Particulate removal outlet 90 includes an aperture 94 located near the bottom of side 16 of the tank which is fitted with a tube 96 extending from the tank and a particulate release valve 98. Aperture 94 communicates with a particulates accumulation region 100 of the separation compartment. When it is necessary or desirable to draw off heavier-than-water materials accumulated in the particulates accumulation region, valve 98 is opened permitting escaping fluid to carry materials from particulates accumulation region 100 into a suitable receptacle (not shown). While it is contemplated in the illustrated embodiment that valve 100 will be operated manually, in alternative embodiments an automatic valve may be provided, programmed to draw off particulate-laden fluid at regular pre-programmed intervals. In a preferred embodiment, a separate particulates collection area will be provided in the separator unit as described, for example, in the embodiment of the invention described below.

Oil removal outlet 92 includes an aperture 102 adjacent top edge 26 of the weir plate in communication with an oil accumulation region 104 in the top of separation compartment 22. Aperture 102 is fitted with a tube 104 extending from the tank and an oil diversion valve 106. Oil diversion valve 106 opens into a "T" connection 108 opening at its top leg 110 into an oil collection reservoir 112 and at its bottom leg 114 into dump valve 116.

Alternatively, oil collection reservoir 112 will not be used and instead the operator will open valve 106 from time to time to determine whether oil needs to be drawn off. Additionally, this may be done with or without reservoir 112 by an automatic valve pre-programmed to draw off accumulated oil at pre-determined intervals.

Finally, a pump 120 is provided for drawing water from clean water compartment 20. Although pump 120 is shown as if located within clean water compartment 20 of tank 12, typically pump 120 will be a process pump already present to supply the cleaned fluid at the degreasing/washing (or lubrication/cooling) station and therefore located outside of the tank. Thus when used in conjunction with the present separator unit, the pump will supply clean aqueous fluid from separator unit 10 to the degreasing/washing or lubrication/cooling station. In any event, clean fluid will be drawn from clean fluid compartment 20 through a pump inlet such as 122 of the pump and delivered where desired from a pump outlet such as outlet 124 through an appropriate conduit 126.

Separator unit 10 may be operated as follows.

1. Tank 12 is filled to a desirable fluid level 131 with clean fluid. Valve 106 is opened to allow fluid to enter and fill separate compartment 22 by purging any air present therein.

2. Contaminated aqueous fluid 62 containing e.g. oil and particulate contaminates from pump-driven aqueous fluids contaminated with emulsified oils, free oils, particulate matter, suspended solids, and other contaminants is introduced into drain receptacle 60 and passes immediately through feed tube 68 into the separation compartment 22 where it enters coalescing field 52 for separation of oils before they are strongly emulsified. In FIG. 1 clean fluid is represented by open arrows 128, emulsified and free oil is represented by solid arrow 130, and particulate contaminants are represented by dots 132. Thus contaminated aqueous fluid 64 is represented by a combination of clean water, oil and particulate contaminants.

Oil 130 in the fluid entering the separation compartment is distributed therein through tube 78 and preferentially accumulated on the surfaces of the polypropylene balls (or other suitable media presenting appropriate oil-coalescing surfaces) while the remaining aqueous fluid 128 flows in direction A, and out through slots 76 and into the clean fluid compartment 20 of the tank where it is drawn out and supplied to the washing station. The clean fluid is drawn out of the clean fluid compartment by process pump 120 at a rate that generally corresponds to the rate of entry of the process fluid, thereby maintaining fluid level 131.

3. As oil 130 attaches itself to the coalescing media surfaces, a point is reached where more oil than the coalescing media can hold is accumulated, and droplets of oil break away, floating in the direction B into accumulation region 104 of separation compartment 22.

4. The oil that rises toward the separation compartment and is intercepted by weir plate 24 is diverted to collection reservoir 112 by opening diversion valve 106. The collection reservoir is emptied by closing diversion valve 106 and opening dump valve 116. Although not necessary, the valve positions may then be reversed to refill the oil collection reservoir by gravity forces. In many cases, the recovered oil may be suitable for reuse or for sale to an oil recycler.

5. From time to time, valve 98 is opened, to purge accumulated solids as described earlier.

Figure 2:
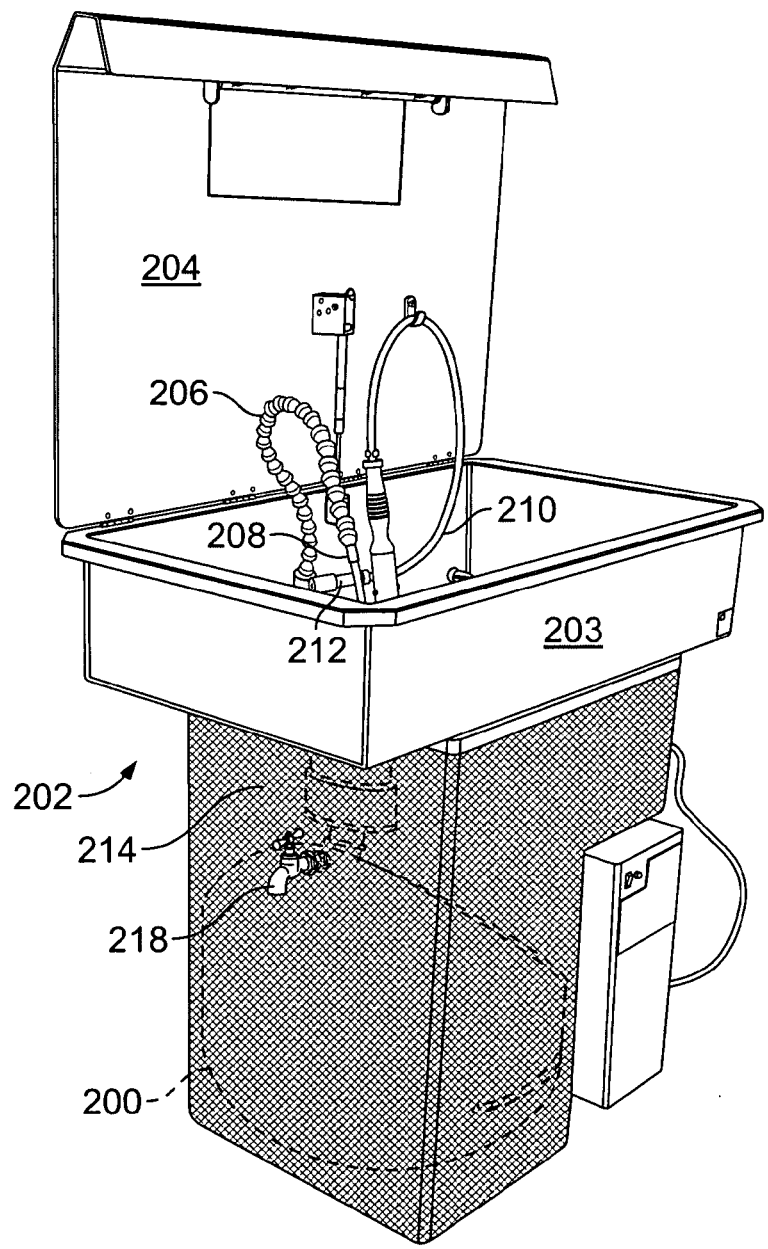
FIG. 2 is a perspective view of a degreaser unit that has been fitted with a separator unit in accordance with a separator unit in accordance with the present invention.
Figure 3:
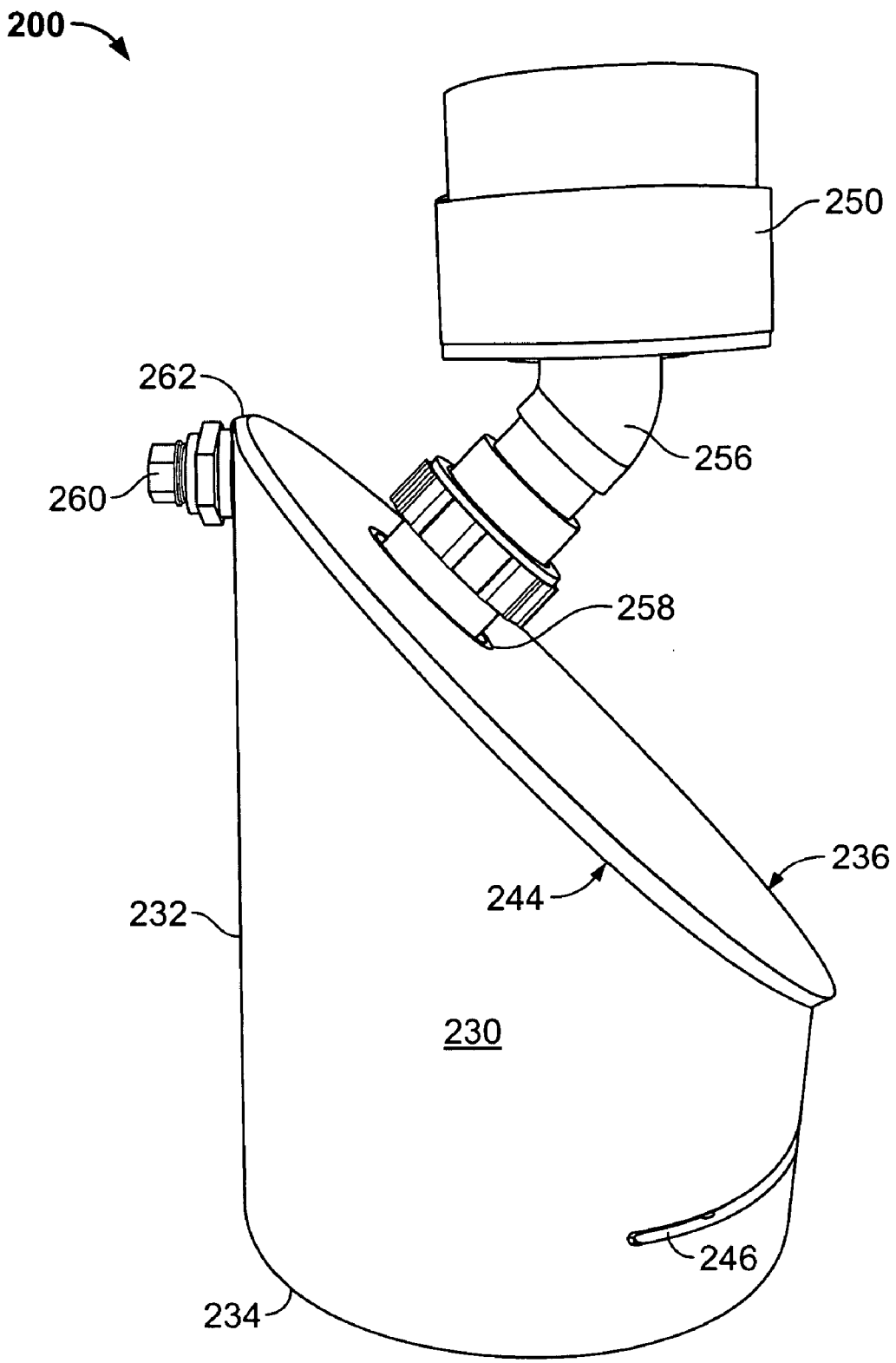
FIG. 3 is a perspective view of an alternate embodiment of a separator unit in accordance with the present invention.
Figure 4:
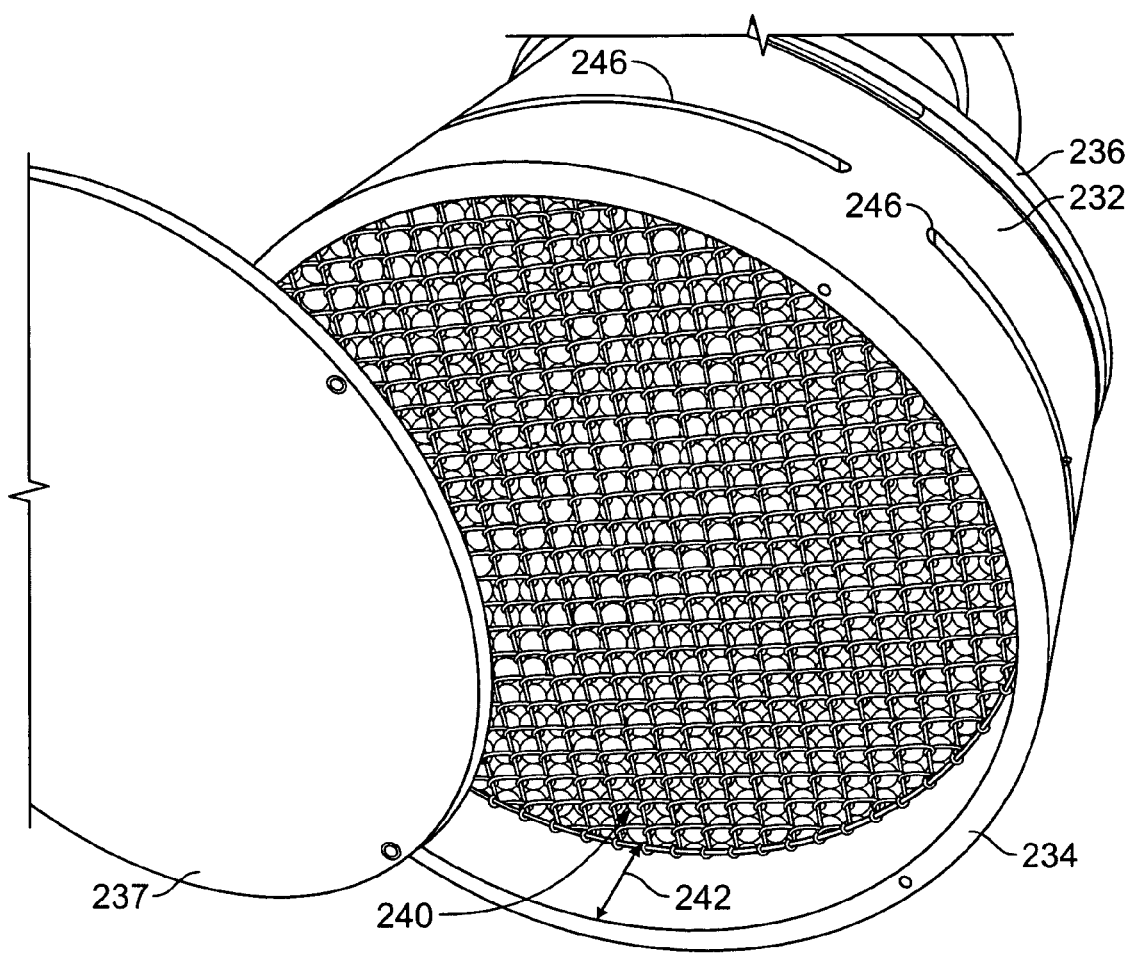
FIG. 4 is a partial perspective view of the bottom of the separator unit of FIG. 3.

FIGS. 3-4 illustrate an alternate embodiment of the present invention. In this embodiment of the invention, a separator unit 200 is provided, which is intended to be integrated into an already existing pump-driven system such as a degreaser unit 202, is illustrated in FIG. 2. This degreaser unit comprises a sink 203, a backstop/cover 204, a flexible gooseneck 206 with a nozzle 208 at its distal end. Gooseneck 206 is attached to the proximal end of a pipe 210 having a shut-off valve 212. A heater (not shown) is also optionally included.

Pipe 210 supplies process fluid (namely an aqueous degreasing/washing, metalworking or other treatment solution as will be discussed in more detail below) from base 214 of the system.

Separator unit 200 is disposed in base 214 of the unit, as show in dotted lines in FIG. 2. An oil release faucet 218 is fitted into one side of the base and may be operated as described below to draw off waste oil separated by the separator unit.

The separator unit 200 of this embodiment of the invention is illustrated in FIGS. 3-4. It includes a cylindrical tank 230 having a generally cylindrical side 232, a bottom 234, and a weir plate 236 which is affixed to the tank at an angle of about 45 degrees to the side of the tank. Unlike the separator unit of FIG. 1, the bottom of tank 230 is generally horizontal. Removal of bottom cover 238, as shown in FIG. 4, reveals a screen 240 affixed in a generally horizontal orientation at a spacing 242 from bottom plate 237. This spacing in the illustrated embodiment may be from about 1 to 4 inches and preferably will be at least about 2 inches. The screen preferably will have openings in the range of about 0.25-1.0 inches in diameter or cross-section and most preferably will have openings of about 0.5 inches in diameter or cross-section.

As in the case of the embodiment of FIG. 1, polypropylene spheres fill the separator compartment which may comprise the entirety of the separator unit between screen 240 and weir plate 236, to establish a separation compartment. In less preferred embodiments, the entire volume of the separator unit need not be filled with the polypropylene balls or other coalescing media. The area of the separator unit between screen 240 and bottom cover 237 comprises a particulate collection compartment and operates as will be described below.

Outflow slots 246 are provided in the outer surface of the separator unit generally corresponding to slots 34 of the embodiment of the invention illustrated in FIG. 1. A drain receptacle 250 is provided, and feeds through a tube 256 at its bottom and an aperture 258 in the upper one-third of weir plate 236 into the coalescing field of polypropylene spheres within the tank. Finally, an outlet tube 260 is provided adjacent the top edge 262 of the weir plate to draw off oil accumulated in the oil accumulation region of the tank.

The separator unit of FIGS. 3 and 4 is used as follows.

1. The separator unit is placed within the collection base of the degreasing unit, with drain receptacle 250 below the drain (not shown) in the sink of the degreaser unit. Oil outlet tube 260 is connected to faucet 218.

2. The separator unit is filled with the desired aqueous degreasing fluid by opening faucet 218 to bleed off excess air while introducing this fluid into the system through the drain in the sink or by other suitable means.

3. The degreaser unit is then operated by starting the operation of the washing station process pump (not shown). This pump supplies the aqueous degreasing fluid to gooseneck 206 through pipe 210 under the desired pressure head.

4. The operator brings oily parts to sink 203 and rinses them with the aqueous degreasing fluid. This fluid, which picks up oil from the surfaces of the parts being cleaned, flows from the sink into drain receptacle 250, through tube 252 and immediately into the coalescing field of the separator unit. The unit then operates generally as described in connection with the separator unit of FIG. 1 acting on the oils before they are strongly emulsified. That is, the freed coalesced oil flows up and is accumulated in the accumulation region of the unit, and clean water is drawn out through slots 246 by the operation of the process pump at a rate chosen to provide the desired residence time in the separation compartment.

While relatively compact separator units have been illustrated and described, the present invention may be scaled up as desired for use with systems handling large quantities of aqueous fluids. For example, the separator units may be used with 10,000 or more gallon systems.

It is preferred in the practice of the present invention that when the separator unit is used with degreasing/washing equipment, the degreasing/washing solution use detergent formulations that form transient emulsions. Such detergent formulations may be referred to as "low-emulsion detergents" (LED) because the emulsions they form readily break up, splitting out the oil. LEDs that are effective in removing oil from part surfaces and that have high oil-carrying characteristics are most preferred in the practice of the present invention. Such cleaners generally clean the substrate by displacing soils thereby lifting the oil from the surface of the parts being cleaned without too greatly emulsifying the oil. Emulsification of the soils is not desired because this tends to load the solution with the soils, reducing its cleaning and degreasing effectiveness. More importantly, if too great an emulsification is achieved, it is more difficult to separate the oil in the separator unit. In one preferred embodiment, 2.5% by weight of an LED is used which is then diluted with water at a rate of 1:4. This combination produces a VOC under 0.5% which meets the most stringent requirements in the United States.

Some chemical characteristics are common to optimal LEDs. Generally, it is desired that the surfactants used have as long a hydrophobic group as possible within the limits of solubility, have backbones comprised straight-chain hydrocarbons, within a surfactant class have terminal positioning of the hydrophilic group and for non-ionic surfactants have a cloud point just above solution temperature. It is generally accepted that surfactants with a Hydrophilic-lipophilic Balance (HLB) range of 3-15 have detergent properties while those in the range of 8-18 have utility in preparing oil/water emulsions. The choice of surfactants with good detergency but poor emulsification properties will be carried out within the framework of these principles.

Examples of particularly-preferred "low-emulsion" surfactants include Rhema Super Matrix, available from Rhema Products, Inc. of Dearborn Heights, Mich.; Dowfax 2A-1, available from Dow Chemical Company of Midland, Mich.; and Witconal SN-90, available from Crompton Corporation of Greenwich, Conn. Rhema Super Matrix is a blend of surfactants in an alkaline builder supplied as a 10% solids solution. Dowfax 2A is a 47% benzene, 1,1-oxybis, tetrapropylene sulfinate sodium salt and a 1% sodium sulfate in water. Finally, Witconal SN-90 is a non-ionic surfactant comprised of 100% C10-C14 ethoxylated alcohols. These surfactants are desirable because they show good detergency for oil removal from surfaces; effectively split oil; and are recyclable.

While particular embodiments of the invention have been shown and described, it will be obvious to those skilled in the art that various changes and modifications may be made therein without departing from the spirit and scope of the invention and, therefore, it is intended in the appended claims to cover all such changes and modification which fall within the true spirit and scope of the invention.

What we claim is:

1. An apparatus for separating oil and particulate contaminants from pump-driven aqueous fluid contaminated with emulsified oils, free oils, particulate matter, suspended solids, or other contaminants comprising:

a container having a wall about the container and a weir plate dividing the container into an upper clean fluid compartment and a lower separation compartment with the top edge of the weir plate adjacent the inner surface of the wall of the container;

coalescing media located in the lower separation compartment;

an inlet in the weir plate for admitting the contaminated aqueous fluid into the lower separation compartment;

an outlet aperture adjacent the bottom edge of the weir plate for accommodating flow of clean water from the lower separation compartment into the upper clean fluid compartment; and an oil removal outlet located below and adjacent the top edge of the weir plate.

2. The apparatus of claim 1 in which the container is a cylindrical tank having a generally cylindrical side.

3. The apparatus of claim 1 in which the weir plate is spaced from the inner surface of the container to form the clean water outlet aperture.

4. The apparatus of claim 1 in which the clean water outlet aperture is formed in the wall of the container.

5. The apparatus of claim 1 in which the top and/or bottom surfaces of the weir plate are smooth to facilitate fluid flow along the plate.

6. The apparatus of claim 1 in which the upper and/or lower surfaces of the weir plate include obstructions to create a tortuous path for fluid passing along the plate.

7. The apparatus of claim 1 in which the tank includes a horizontal bottom portion and the weir plate extends at an angle to the horizontal bottom portion of from about 20 to about 90 degrees.

8. The apparatus of claim 7 in which the weir plate extends at an angle of approximately 45°.

9. The apparatus of claim 1 in which the outflow aperture is sized relative to the pumping rate of the pump driving the aqueous fluid to ensure a residence time of the contaminated fluid in the lower separation compartment of at least about 0.4 minutes.

10. The apparatus of claim 9 in which the residence time is at least 1 minute.

11. The apparatus of claim 1 in which the coalescing media fills the lower separation compartment.

12. The apparatus of claim 1 in which the coalescing media comprises a plurality of abutting polypropylene spheres.

13. The apparatus of claim 12 in which the spheres are hollow and have openings distributed about their surface.

14. The apparatus of claim 12 in which the diameter of the spheres is in the range of about 0.5 to about 2.0 inches.

15. The apparatus of claim 12 in which the diameter of the spheres is about 1.25 inches.

16. The apparatus of claim 13 in which the openings are triangular.

17. The apparatus of claim 13 in which the openings comprise open pores.

18. The apparatus of claim 1 including drain receptacle means for collecting the contaminated fluid and delivering the contaminated fluid across the weir plate to the lower separation compartment.

19. The apparatus of claim 1 including means for distributing the contaminated fluid in the lower separation compartment including an enclosed distributor member disposed within the coalescing media having openings disposed on its surface to slow and distribute the contaminated fluid flow into the separation compartment.

20. The apparatus of claim 1 including a particulate removal outlet adjacent the bottom of the container.

21. The apparatus of claim 20 including a valve for drawing off particulate-laden fluid from the particulate removal outlet.

22. The apparatus of claim 1 including a valve for drawing oil and other lighter-than-water materials from the oil removal outlet.

23. The apparatus of claim 22 including means for automatically opening and closing the valve at the oil removal outlet.

24. The apparatus of claim 1 including a pump for drawing water from the clean fluid compartment.

25. The apparatus of claim 1 in which the lower separation compartment is spaced from the bottom of the container to define a particulate collection compartment, the separation being established by a screen.

26. The apparatus of claim 25 in which the screen has openings with cross-sections or diameters in the range of from about 0.25 to 1.0 inches.

27. The apparatus of claim 25 in which the screen has openings with cross-sections or diameters of 0.5 inches.

28. The apparatus of claim 1 including a fluid storage reservoir from which pump-driven aqueous fluids are delivered from degreasing/washing, metalworking, cooling and other processes in which the aqueous fluid becomes contaminated over time, the apparatus being positioned within the reservoir to receive the contaminated fluids, to separate the contaminants therefrom, and to supply clean aqueous fluid.

29. An apparatus for separating oil and particulate contaminants from pump-driven aqueous fluid contaminated with emulsified oils, free oils, particulate matter, suspended solids, or other contaminants comprising:

a container having a horizontal bottom portion and a weir plate at an angle to the horizontal bottom portion of from about 20 to about 90 degrees dividing the container into an upper clean fluid compartment and a lower separation compartment, the weir plate having an inlet for admitting the contaminated aqueous fluid into the lower separation compartment;

an aperture adjacent the bottom edge of the weir plate for the outflow of clean fluid from the lower separation compartment to the upper clean fluid compartment sized relative to the pumping rate of the pump driving the aqueous fluid to ensure a residence time of the contaminated fluid in the lower separation compartment of at least about 0.4 minutes;

coalescing media comprising a plurality of abutting polypropylene spheres located in the lower separation compartment;

drain receptacle means for collecting the contaminated fluid and delivering the contaminated fluid across the weir plate to the lower separation compartment; and an oil removal outlet in communication with the lower separation compartment and located below and adjacent the top edge of the weir plate.

30. The apparatus of claim 29 including a particulate removal outlet adjacent the bottom of the container.

31. The apparatus of claim 29 in which the lower separation compartment is spaced from the bottom of the container to define a particulate collection compartment, the separation being established by a screen.

* * * * *